Figure 1:
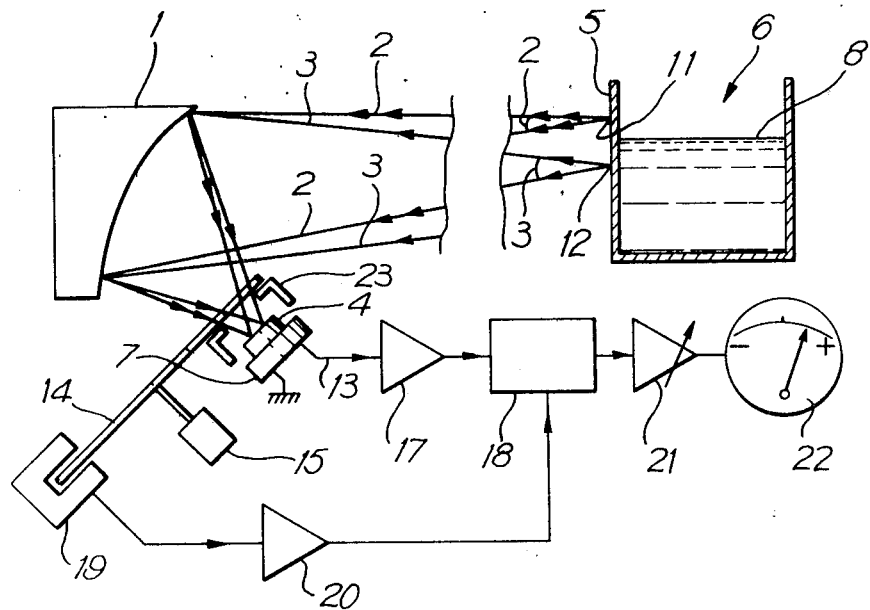

United States Patent [19]

Baker et al.

[11] 4,442,357

[45] Apr. 10, 1984

[54] DIFFERENTIAL RADIATION DETECTION APPARATUS

[75] Inventors: Geoffrey Baker; Roger A. Lockett, both of Southampton, England

[73] Assignee: U.S. Philips Corporation, New York, N.Y.

[21] Appl. No.: 304,290

[22] Filed: Sep. 21, 1981

[30] Foreign Application Priority Data

Sep. 26, 1980 [GB] United Kingdom ............... 8031083

[51] Int. Cl.³ .................. G01J 1/00; G01F 23/00
[52] U.S. Cl. ........................... 250/338; 250/351; 250/353; 250/357.1
[58] Field of Search ............. 250/330, 338, 342, 347, 250/349, 350, 351, 353, 357.1; 374/54

[56] References Cited

U.S. PATENT DOCUMENTS

| | | | |
|---|---|---|---|
| 3,392,282 | 7/1968 | Astheimer | 250/351 |
| 3,480,777 | 11/1969 | Astheimer | 250/351 |
| 4,063,093 | 12/1977 | Astheimer et al. | 250/330 |
| 4,321,594 | 3/1982 | Galvin et al. | 250/353 |

*Primary Examiner*—Janice A. Howell
*Attorney, Agent, or Firm*—Robert T. Mayer; Bernard Franzblau

[57] ABSTRACT

The indication of temperature discontinuities in a scene can be used to indicate the boundaries of objects, for example the level of the contents of a storage silo. The thermal radiation from the object scene is imaged upon a pair of adjacent pyroelectric radiation detectors 9, 10. The scene radiation is chopped and the difference in detector outputs displayed to the observer while the field of view of the detectors, aligned with a visual aiming sight, is traversed across the object. The location and sign of a temperature discontinuity in the visual scene enables the observer to measure the silo contents.

9 Claims, 2 Drawing Figures

DIFFERENTIAL RADIATION DETECTION APPARATUS

This invention relates to apparatus for detecting thermal radiation emitted by objects in a field of view and more particularly it relates to apparatus for detecting the difference in radiation emitted by adjacent parts of an object.

In U.S. patent application Ser. No. 137,028, filed Apr. 3, 1980, now U.S. Pat. No. 4,336,452, and incorporated herein by reference, radiation detectors are connected in opposition in pairs so that the difference in their output signals is obtained. Changes in input radiation common to both detectors of a pair will produce equal and mutually cancelling signals. But a change in input radiation to only one detector of a pair will produce a differential output signal.

However, thermal radiation detectors, when combined with their associated amplifiers, are generally more suitable for producing a.c. or transient output signals. For example, when such detectors are used in an intruder detection apparatus, the movement of an intruder can produce a transient signal at the amplifier output which can be used to raise an alarm. However, if the intruder remains stationary no output signal is produced and detection is not possible. Thus there is a need to detect constant temperature differences.

Differential thermal radiation detection apparatus can also find application in analysing an industrial environment. For example, materials such as liquids or granular or powdered solids may be stored in vertical storage tanks and the material in contact with the tank wall may produce a temperature difference in the wall when compared to those parts of the wall above the level of the material. Thus detection of a vertical step change in wall temperature may indicate the level of materials within the tank.

It is an object of the invention to detect constant temperature differences and the invention provides a differential radiation detection apparatus comprising an objective adapted to form a real image of a field of view in an image plane using thermal radiation emitted by objects in said field of view, a pair of thermal radiation detectors adjacent to one another in said image plane, a radiation chopper located between said objective and said detectors and substantially in said image plane, said chopper having blades which chop the real image radiation falling on both detectors, and circuit means for extracting and displaying the difference in the a.c. output signals at the chopping frequency of said detectors. The field of view of the detectors may be scanned across the scene in a direction parallel to the line joining the two detectors until a difference signal is obtained. The apparatus may then be aligned to produce the maximum difference signal. By incorporating in the apparatus a visual sight with an aiming mark aligned with the field of view of the detectors, an observer may locate the radiance discontinuity corresponding to a temperature step or to an emissivity difference or to a combination of both.

In principle the a.c. output signals of the two detectors may be rectified to produce d.c. signals which are applied to a differential amplifier to produce said difference. More conveniently, the a.c. signals may be subtracted directly from one another provided they are in phase with one another. To ensure this, a chopper may be used in which each chopper blade simultaneously masks both detectors and then simultaneously exposes both detectors.

The subtraction of the a.c. signals from one another may be accomplished directly in apparatus in which said detectors are pyroelectric detectors formed on a single body of polarised pyroelectric material, each detector having electrodes on opposite major surfaces of said body, which electrodes extend substantially normal to the direction of polarisation, and in which said detectors are connected in series opposition relative to the polarisation direction to provide a single output signal representing said difference.

It may be sufficient in analysing the scene to indicate to the user only the magnitude of the difference signal displayed for example, as the brightness of a point light source superimposed in the field of view of the visual sight and possibly aligned with the aiming mark or as the deflection of a meter visible in the visual sight. But if the sign of the radiance discontinuity is needed, said circuit means may comprise a phase sensitive detector connected to receive said single output signal and a reference signal derived from said chopper and to supply a d.c. output signal of positive or negative polarity depending on which of the two detectors produces the greater amplitude of a.c. signal. A centre-zero meter may then be used to display both the magnitude and sign of the difference signal.

Figure 2:
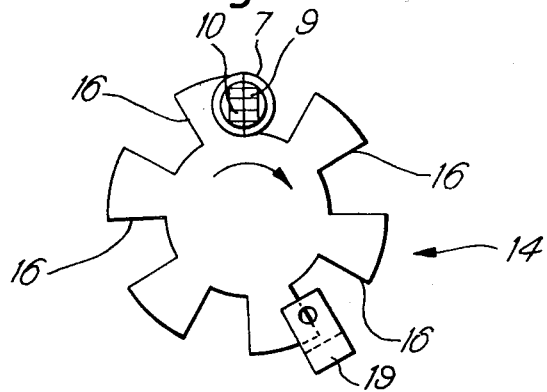

An embodiment of the invention will now be described, by way of example, with reference to the accompanying drawing in which:

FIG. 1 shows a schematic layout of the optical, mechanical and electronic parts of a differential radiation detector, and FIG. 2 shows the chopper used in the FIG. 1 layout with the detectors and the phase reference elements in their relative positions.

In FIG. 1, off-axis paraboloid mirror 1 functions as an objective lens and forms a real image 4 of part of the wall 5 of a storage tank 6 on an image plane of a detector assembly 7. The part of the wall imaged is that immediately above (11) and below (22) the level 8 of a liquid in the tank. In FIG. 2, the detector assembly 7 is shown in plan view and comprises a pair of thermal radiation detectors 9 and 10. In FIG. 1 the cone of rays 2 from the point 11 above the liquid level 8 intercepted by the mirror 1 is shown focussed on the detector 10 and the corresponding cone of rays 3 from the point 12 below the liquid level 8 is shown focussed on the detector 9. The pair of detectors 9 and 10 are pyroelectric detectors formed on a single body of polarised pyroelectric material, for example of modified lead zirconate titanate of approximately 3.5 mm×3.0 mm×50 micron thickness. On one major surface of the body there are a pair of rectangular electrodes consisting of nichrome which can be penetrated by thermal radiation. On the other major surface there is a common nichrome electrode. The direction of polarisation is normal to the major surfaces and hence the two detectors are connected in series opposition by the common electrode. A field effect transistor is connected to receive the combined detector outputs and to supply a single-ended output on conductor 13 comprising the difference in detector outputs. Further details of the detector construction and its immediate circuits are given in the aforesaid U.S. patent application Ser. No. 137,028.

A six-bladed chopper disc 14 is driven at approximately 4 revolutions per second by a d.c. motor 15 giving a chopping frequency of some 24 Hz. The chopper disc is positioned so that the edges 16 of the blades sweep simultaneously across both detectors, shutting off or exposing both detectors at substantially the same rate. When a chopper blade cuts off the scene radiation, 2, 3, the detectors are exposed to thermal radiation from the blade which will generally differ from the scene radiance but which will be equal for the two detectors. In the event that the radiance of the targets 11 and 12 are equal to one another, the chopper arrangement ensures that the detector outputs are equal in detail as a function of time during the change over from scene radiation to chopper radiation and vice-versa as each blade sweeps over the detector pair, ensuring substantially zero a.c. output on conductor 13.

A limiting aperture 23 is placed between the chopper disc 14 and the detector assembly 7 to limit the field of view of the detectors 9 and 10 to the reflecting surface of mirror 1 as far as possible.

The a.c. signal on conductor 13 is fed via preamplifier 17 to a phase-sensitive detector 18 which receives a reference a.c. signal from a light emitting diode and phototransistor blade detector 19 via a pulse shaper 20. The output of phase sensitive detector 18 is fed via a variable gain amplifier 21 to a centre zero meter 22 and consists of a d.c. signal whose magnitude indicates the radiance difference between targets 11 and 12 and whose sign indicates whether target 11 is of greater or lesser radiance than target 12. By reason of the differing thermal histories of the tank wall and the liquid contained in the tank, a radiance difference between targets 11 and 12 may exist and the position of this difference may indicate the level of the liquid in the tank. An aiming sight may be provided aligned with the detector field of view in which the phase sensitive detector output is simultaneously displayed, allowing an operator to manually scan the apparatus up the tank wall with the detectors effectively aligned vertically under one another so as to visually locate any radiance discontinuity which may exist.

The mirror 1 may be replaced by a refracting objective, in which case the detector assembly 7, the limiting aperture 23 and the chopper 14 are arranged on the axis of the refracting objective to receive radiation transmitted by the objective and focussed on the detectors 9, 10. A simple and cheap refracting objective may comprise a fresnel lens moulded in a thin polythene sheet so as to be substantially transparent to infra-red radiation. Suitable lenses are manufactured by "Lectric Lite" of Fort Worth, Texas from their POLY IR (trade mark) materials.

We claim:

1. A differential radiation detection apparatus comprising an objective for forming a real image of a field of view in an image plane in response to thermal radiation emitted by objects in said field of view, a pair of thermal radiation detectors adjacent to one another in said image plane, a radiation chopper located between said objective and said detectors and substantially in said image plane, said chopper having blades which chop the real image radiation falling on both detectors at a predetermined chopping frequency, and circuit means for extracting a.c. output signals at the chopping frequency of each of said detectors and including means for deriving a signal determined by the difference between said a.c. output signals.

2. Apparatus as claimed in claim 1 wherein the chopper is formed and the detectors are disposed in relation thereto so that each chopper blade simultaneously masks both detectors and then simultaneously exposes both detectors.

3. Apparatus as claimed in claim 2 wherein said detectors comprise pyroelectric detectors formed on a single body of polarised pyroelectric material, each detector having electrodes on opposite major surfaces of said body, which electrodes extend substantially normal to the direction of polarisation, and in which said detectors are connected in series opposition relative to the polarisation direction to provide a single output signal representing said difference.

4. Apparatus as claimed in claim 3 wherein said circuit means comprise a phase sensitive detector connected to receive said single output signal and a reference signal derived from said chopper and to supply a d.c. output signal of positive or negative polarity depending on which of the two detectors produces the greater amplitude of a.c. signal.

5. Apparatus as claimed in claim 1 further comprising means responsive to the difference signal for displaying said signal.

6. Apparatus as claimed in claim 1 wherein said detectors comprise first and second pyroelectric detectors formed on a single body of polarized pyroelectric material, each detector having electrodes on opposite major surfaces of said body, and wherein said detectors are connected in series opposition to provide a single output signal representing the difference signal.

7. A differential radiation detection apparatus comprising first and second thermal radiation detectors disposed adjacent one another in an image plane, means for receiving and focusing thermal radiation from first and second adjacent areas of an object in the field of view of said apparatus onto said first and second detectors, respectively, a radiation modulator interposed in the path of the focused thermal radiation for periodically interrupting the thermal radiation to said detectors at a given frequency whereby the first and second detectors produce first and second AC signals at said given frequency and determined by the thermal radiation from said first and second areas of the object, and means for subtractively combining said first and second AC signals to derive a difference signal.

8. An apparatus as claimed in claim 7 wherein said first and second detectors comprise a single body of polarized pyroelectric material with electrodes on opposite major surfaces of the body, and wherein said combining means comprises means for electrically connecting the electrodes of the first and second detectors in series opposition to provide a single output signal representing said difference signal.

9. An apparatus as claimed in claim 7 further comprising, means responsive to the modulator for deriving a reference signal in synchronism with said first and second AC signals, a phase detector having a first input coupled to receive the reference signal and a second input coupled to receive the difference signal, and means coupling an output of the phase detector to a visual display apparatus that indicates the magnitude of any temperature difference between said first and second areas on the object and also which of said areas has the higher temperature.

* * * * *